United States Patent
Itoh et al.

(10) Patent No.: US 7,261,845 B2
(45) Date of Patent: Aug. 28, 2007

(54) PLASTIC LENS AND PROCESS FOR PREPARING THE LENS

(75) Inventors: Shinsuke Itoh, Tokyo (JP); Masahisa Kosaka, Tokyo (JP)

(73) Assignee: Hoya Corporation (JP)

(*) Notice: Subject to any disclaimer, the term of this patent is extended or adjusted under 35 U.S.C. 154(b) by 171 days.

(21) Appl. No.: 10/952,858

(22) Filed: Sep. 30, 2004

(65) Prior Publication Data

US 2005/0068492 A1    Mar. 31, 2005

(30) Foreign Application Priority Data

Sep. 30, 2003  (JP) .............................. 2003-340937

(51) Int. Cl.
  B29D 11/00   (2006.01)
  G02B 3/00    (2006.01)
  C08J 3/00    (2006.01)
  C08K 5/13    (2006.01)
  C08L 31/00   (2006.01)

(52) U.S. Cl. .................. 264/1.1; 252/588; 252/589; 264/1.32; 264/331.21; 264/331.13; 351/41; 351/45; 351/163; 428/412; 523/106; 524/335; 524/336; 524/337; 524/338; 524/339; 524/340; 524/431; 524/543; 524/558

(58) Field of Classification Search ................ 523/106; 524/335, 336, 337, 338, 339, 340, 431, 543, 524/558; 428/412; 252/588, 589; 351/41, 351/45, 163; 264/1.1, 1.32, 331.21, 331.13
See application file for complete search history.

(56) References Cited

U.S. PATENT DOCUMENTS

| | | | |
|---|---|---|---|
| 4,108,827 A | | 8/1978 | La Liberte |
| 4,273,702 A | | 6/1981 | Leatherman |
| 4,304,895 A | | 12/1981 | Loshaek |
| 4,975,328 A | | 12/1990 | Hirose et al. |
| 5,128,384 A | * | 7/1992 | Renzi et al. .................. 522/13 |
| 5,635,580 A | | 6/1997 | Kosaka et al. |
| 5,744,568 A | | 4/1998 | Kosaka et al. |
| 5,945,504 A | | 8/1999 | Amagi et al. |
| 5,952,096 A | * | 9/1999 | Yamashita et al. .......... 428/332 |
| 6,274,694 B1 | | 8/2001 | Kosaka et al. |
| 6,448,304 B1 | | 9/2002 | Kosaka et al. |

FOREIGN PATENT DOCUMENTS

| | | |
|---|---|---|
| JP | 50-50049 | 5/1975 |
| JP | 51-125487 | 11/1976 |
| JP | 54-41965 | 4/1979 |
| JP | 58-122501 | 7/1983 |
| JP | 60-245607 | 5/1985 |
| JP | 62-254119 | 11/1987 |
| JP | 01-503809 | 3/1989 |
| JP | 01-163012 | 6/1989 |
| JP | 2-93422 | 4/1990 |
| JP | 2-171716 | 7/1990 |
| JP | 03-281312 | 12/1991 |
| JP | 5-195445 | 8/1993 |
| JP | 5-195446 | 8/1993 |
| JP | 07-063902 | 3/1995 |
| JP | 07-104101 | 4/1995 |
| JP | 09-208621 | 8/1997 |
| JP | 09-255781 | 9/1997 |
| JP | 9-265059 | 10/1997 |
| JP | 2001-91908 | 4/2001 |
| WO | WO89/00699 | 1/1989 |

OTHER PUBLICATIONS

International Search Report dated Feb. 8, 2005.

* cited by examiner

*Primary Examiner*—Patrick Niland
(74) *Attorney, Agent, or Firm*—Finnegan, Henderson, Farabow, Garrett & Dunner, LLP

(57) ABSTRACT

A plastic lens which absorbs ultraviolet light having wavelength of about 400 nm and suppresses coloring and a process for producing the lens. A plastic lens may be made from a composition which comprises (A) a lens material monomer comprising diethylene glycol bisallylcarbonate, (B) an organic peroxide-based polymerization initiator, (C) a cobalt compound represented by at least one of $CoO \cdot Al_2O_3$ and $Co \cdot Al_2O_4$, and (D) at least one ultraviolet light absorbent selected from 2-hydroxy-4-octyloxy-benzophenone, 2,2',4,4'-tetrahydroxy-4-octyloxybenzophenone and 2,2',4'-trihydroxy-4-octyloxybenzophenone. A process for producing a plastic lens comprises mixing component (A), component (B), a cobalt fluid comprising component (C) in a dispersant and component (D) and a step of casting the mixed fluid into a mold and polymerizing the fluid to obtain a plastic lens.

6 Claims, No Drawings

PLASTIC LENS AND PROCESS FOR PREPARING THE LENS

CROSS-REFERENCE TO RELATED APPLICATION

The present invention claims priority under 35 U.S.C. § 119 of Japanese Application No. 2003-340937 filed Sep. 30, 2003, the disclosure of which is expressly incorporated by reference herein in its entirety.

DESCRIPTION OF THE INVENTION

1. Field of the Invention

The present invention relates to a plastic lens exhibiting an excellent property for absorbing ultraviolet light and a process for producing the lens. More particularly, the present invention relates to a plastic lens which absorbs ultraviolet light having a wavelength of about 400 nm and suppresses coloring and a process for producing the lens.

2. Background of the Invention

Ultraviolet light is an electromagnetic wave having a wavelength in the range of about 200 to 400 nm and is considered to adversely affect the human health in various ways. It is increasingly desired for a spectacle lens that the lens absorbs ultraviolet light to protect the human eyes from ultraviolet light.

There are various processes for providing the ability to absorb ultraviolet light to a plastic spectacle lens. As a first of such processes, it is proposed that 2,2'-dihydroxy-4-methoxybenzophenone, 2,2'-dihydroxy-4-n-octoxybenzophenone or the like is mixed into a plastic lens monomer as the ultraviolet light absorbent, and a plastic lens is prepared by polymerizing the obtained plastic lens monomer. Examples of these processes are described in: Japanese Patent Application Laid-Open No. Showa 50(1975)-50049; Japanese Patent Application Laid-Open No. Showa 58(1983)-122501; Japanese Patent Application Laid-Open No. Heisei 2(1990)-171716; Japanese Patent Application Laid-Open No. Heisei 2(1990)-93422; and Japanese Patent Application Laid-Open No. Showa 62(1983)-254119.

However, when a lens absorbing ultraviolet light having a wavelength up to about 400 nm is produced by using a conventionally used ultraviolet light absorbent such as 2,2'-dihydroxy-4-methoxy-benzophenone, 2,2'-dihydroxy-4-n-octoxybenzophenone and the like in accordance with the first process, a problem arises in that the prepared lens is markedly yellowed to cause poor appearance, in particular, when diethylene glycol bisallylcarbonate, which is the typical material for plastic spectacle lenses, is used.

As a second process for providing the ability to absorb ultraviolet light to a plastic spectacle lens, in accordance with the same process as that for tinting a plastic lens, the plastic lens is impregnated with an ultraviolet light absorbent by dipping the plastic lens into an aqueous fluid heated at 80 to 100° C. in which the ultraviolet light absorbent is dispersed. This process is exemplified in Japanese Patent Application Laid-Open No. 2001-91908. It is estimated that most of the commercial plastic spectacle lenses having the property of absorbing ultraviolet light having a wavelength up to 400 nm are produced in accordance with the second process.

However, in the preparation of a plastic lens having the property of absorbing ultraviolet light having a wavelength up to about 400 nm in accordance with the second process, it is necessary that the lens be dipped for a time as long as about 40 minutes when a sufficient ability to absorb ultraviolet light is provided to the plastic spectacle lens, and this causes a decrease in the productivity. To improve the productivity, it is proposed that an organic solvent is used in place of water which is conventionally used. However, there is the possibility that the plastic lens absorbing ultraviolet light having the wavelength up to about 400 nm produced in accordance with this process is more markedly yellowed.

As a third process for providing the ability to absorb ultraviolet light to a plastic spectacle lens, the surface of the plastic lens is coated with a substance absorbing and/or scattering ultraviolet light. This process is exemplified in Japanese Patent Application Laid-Open 9(1999)-265059. However, the third process has problems in that, when the layer absorbing ultraviolet light is formed, there are possibilities that scratch resistance of the lens is insufficient and that the formed coating film of the layer tends to be cleaved.

SUMMARY OF THE INVENTION

The present invention has been made to overcome the above problems. The present invention has an object of providing a plastic lens which absorbs ultraviolet light having a wavelength of about 400 nm and suppresses coloring and a process for producing the lens.

DESCRIPTION OF EMBODIMENTS

As the result of intensive studies by the present inventors to achieve the above object, it was found that the above object could be achieved by a combination of a specific ultraviolet light absorbent shown in the following as component (D) with other components (A) to (C), and the present invention was completed based on this knowledge.

The present invention provides a plastic lens from a composition that comprises the following components A to D:

(A) a lens material monomer comprising diethylene glycol bisallylcarbonate as an essential component, (B) an organic peroxide-based polymerization initiator, (C) a cobalt compound represented by at least one of $CoO.Al_2O_3$ and $Co.Al_2O_4$, and (D) at least one ultraviolet light absorbent selected from 2-hydroxy-4-octyloxybenzophenone, 2,2',4,4'-tetrahydroxy-4-octyloxy-benzophenone and 2,2',4'-trihydroxy-4-octyloxybenzophenone.

The present invention also provides a process for producing a plastic lens which comprises:

mixing components (A) to (D) to form a mixed fluid:

(A) a lens material monomer comprising diethylene glycol bisallylcarbonate as an essential component, (B) an organic peroxide-based polymerization initiator, (C) a cobalt fluid comprising a cobalt compound represented by at least one of $CoO.Al_2O_3$ and $Co.Al_2O_4$ in a dispersant, and (D) at least one ultraviolet light absorbent selected from 2-hydroxy-4-octyloxybenzophenone, 2,2',4,4'-tetrahydroxy-4-octyloxy-benzophenone and 2,2',4'-trihydroxy-4-octyloxybenzophenone; and casting the mixed fluid into a mold and polymerizing the fluid to obtain a plastic lens.

In accordance with the process of the present invention, a plastic lens which absorbs ultraviolet light having a wavelength of about 400 nm and suppresses coloring can be obtained.

The plastic lens of the present invention can be made from a composition comprising of the following components A to D:

(A) a lens material monomer comprising diethylene glycol bisallylcarbonate as an essential component,
(B) an organic peroxide-based polymerization initiator,
(C) a cobalt compound represented by at least one of $CoO.Al_2O_3$ and $Co.Al_2O_4$, and
(D) at least one ultraviolet light absorbent selected from 2-hydroxy-4-octyloxybenzophenone, 2,2',4,4'-tetrahydroxy-4-octyloxy-benzophenone and 2,2',4'-trihydroxy-4-octyloxybenzophenone.

Each component will be described in the following.

In the present invention, the lens material monomer comprising diethylene glycol bisallylcarbonate as an essential component means diethylene glycol bisallylcarbonate alone or a mixed monomer comprising diethylene glycol bisallylcarbonate and monomers copolymerizable with diethylene glycol bisallylcarbonate.

Examples of the monomer copolymerizable with diethylene glycol bisallylcarbonate include aromatic vinyl monomers such as styrene, α-methylstyrene, vinyltoluene, chlorostyrene, chloromethylstyrene and divinylbenzene; mono (meth)acrylates such as methyl(meth)acrylate, n-butyl (meth)acrylate, n-hexyl (meth)acrylate, cyclohexyl(meth) acrylate, 2-ethylhexyl(meth)acrylate, methoxydiethylene glycol (meth)acrylate, methoxypolyethylene glycol (meth) acrylate, 3-chloro-2-hydroxypropyl(meth)acrylate, stearyl (meth)acrylate, lauryl(meth)acrylate, phenyl(meth)acrylate, glycidyl(meth)acrylate and benzyl(meth)acrylate; mono (meth)acrylates having a hydroxyl group such as 2-hydroxyethyl(meth)acrylate, 2-hydroxypropyl(meth)acrylate, 3-hydroxypropyl(meth)acrylate, 3-phenoxy-2-hydroxypropyl (meth)acrylate and 4-hydroxybutyl(meth)acrylate; di(meth) acrylates such as ethylene glycol di(meth)acrylate, diethylene glycol di(meth)acrylate, triethylene glycol di(meth)acrylate, polyethylene glycol di(meth)acrylate, 1,3-butylene glycol di(meth)acrylate, 1,6-hexanediol di(meth) acrylate, neopentyl glycol di(meth)acrylate, polypropylene glycol di(meth)acrylate, 2-hydroxy-1,3-di(meth)acryloxypropane, 2,2-bis[4-((meth)acryloxyethoxy)phenyl]propane, 2,2-bis[4-((meth)acryloxy diethoxy)phenyl]propane and 2,2-bis[4-((meth)-acryloxy.polyethoxy)phenyl]propane; tri(meth)acrylates such as trimethylolpropane trimethacrylate and tetramethylolmethane trimethacrylate; tetra(meth) acrylates such as tetramethylolmethane tetra(meth)acrylate (in the present specification, a (meth)acrylate means a methacrylate or an acrylate); diallyl phthalate; diallyl isophthalate; and diallyl terephthalate.

In the present invention, compounds having an aromatic ring are preferred among these compounds from the standpoint of providing a plastic spectacle lens having a great refractive index. Copolymers of diethylene glycol bisallylcarbonate and other monomers have been known. Examples of such copolymers include copolymers disclosed in Japanese Patent Application Laid-Open Nos. Showa 54(1979)-41965, Showa 51(1976)-125487 and Heisei 01(1989)-503809. Mixtures of diethylene glycol bisallylcarbonate and monomers copolymerizable with diethylene glycol bisallylcarbonate described in the specifications of these applications are included in the diethylene glycol bisallylcarbonate-based monomer in the present invention.

The amount of component (A) in the polymerizable composition will vary depending on the materials selected for each of the ingredients. In general, component (A) will be present in an amount in the range of 30 to 100% by weight based on the amount of the entire material of the plastic lens composition described above. Preferably, it is present in the range of 50 to 100% by weight when using diethylene glycol bisallylcarbonate as component (A).

In the present invention, the organic peroxide-based polymerization initiator of component (B) is the component necessary for polymerizing the lens material monomer comprising diethylene glycol bisallylcarbonate of component (A) as an essential component. The organic peroxide-based polymerization initiator is not particularly limited, and a conventional organic peroxide-based polymerization initiator can be used. Examples of the organic peroxide-based polymerization initiator include benzoyl peroxide, diisopropyl peroxydicarbonate and t-butyl peroxy-2-ethyl-hexanoate. Among these compounds, diisopropyl peroxydicarbonate is preferred.

It is preferable that the amount of component (B) is in the range of 0.1 to 5.0% by weight based on the amount of the entire material for the plastic lens composition described above. In accordance with the description in Japanese Patent Application Laid-Open No. Heisei 5(1993)-195445, it is known that component B has the function of bluing a lens.

In the present invention, the cobalt compound represented by at least one of $CoO.Al_2O_3$ and $Co.Al_2O_4$, which is component (C), is a known compound disclosed in Japanese Patent Application Laid-Open Nos. Heisei 5(1993)-195445 and Heisei 5(1993)-195446 and the U.S. Pat. No. 4,273,702.

In the present invention, it is preferable that the particle diameter of the cobalt compound is in the range of 10 to 1,000 nm, more preferably in the range of 10 to 500 nm and most preferably in the range of 40 to 60 nm.

It is preferable that the amount of component (C) is in the range of 0.00005 to 0.005% by weight based on the amount of the entire material of the plastic lens composition described above.

In the present invention, the ultraviolet light absorbent of component (D) is at least one compound selected from 2-hydroxy-4-octyloxybenzophenone, 2,2',4,4'-tetrahydroxy-4-octyloxy-benzophenone and 2,2',4'-trihydroxy-4-octyloxybenzophenone. Among these compounds, 2,2',4'-trihydroxy-4-octyloxybenzophenone is preferred.

It is preferable that the amount of component (D) is in the range of 0.01 to 5.0% by weight based on the amount of the entire material of the plastic lens composition described above although the amount depends on the ability of the ultraviolet light absorbent to absorb ultraviolet light and the wavelength of ultraviolet light absorbed with the ultraviolet light absorbent.

It is preferable that the plastic lens substrate has a YI value (a degree of yellowness) in the range of 0.4 to 1.5 and a transmittance of ultraviolet light having a wavelength of 385 nm of 5.0% or smaller at the central portion when the central portion has a thickness of 2.2 mm. It is more preferable that the YI value is in the range of 0.4 to 1.0, and the transmittance is 3.0% or smaller. It is most preferable that the YI value is in the range of 0.4 to 0.7, and the transmittance is 1.0% or smaller.

The process for producing a plastic lens of the present invention comprises a step of mixing component (A), component (B), a cobalt fluid comprising component (C) dispersed in a dispersant and component (D) and a step of casting the mixed fluid obtained in the step of mixing into a mold and polymerizing the fluid to obtain a plastic lens substrate.

In the process of the present invention, a conventional dispersant such as a surfactant, an alcohol, a Cellosolve, a glycol ether, a hydrocarbon, a halogenated hydrocarbon and an ester can be used for dispersing compound (C). It is preferable that at least one dispersant selected from alcohols, Cellosolves and surfactants are used as the dispersant.

Among these dispersants, mixed fluids of methyl Cellosolve and n-butanol are more preferable. The surfactant is not particularly limited, and surfactants exhibiting excellent effect of dispersion are preferable. Suitable surfactants include anionic acid surfactants such as alkylbenzenesulfonates, alkylnaphthalenesulfonates, alkylsulfosuccinates, aromatic sulfonic acid-formal in condensates, and lauryl sulfonates, or a nonionic surfactant such as polyoxyethylalkyl ethers, alkylamine ethers, and polyoxyethylene sorbitan fatty acid esters. It is preferable that the concentration of component (C) is in the range of 0.5 to 30.0% by weight based on the amount of the combination of the dispersant and component (C).

In the present invention, it is preferable that the mixed fluid prepared above is degassed to remove the entire amount or a portion of the dispersant, and the degassed fluid is cast into a mold and polymerized to obtain the plastic lens.

The process for polymerizing the plastic lens monomer is not particularly limited. In general, cast polymerization is used. The mixed fluid of components (A) to (D) described above is cast into a mold for forming a lens, and a plastic lens is obtained by heating at a temperature in the range of −20 to 150° C.

To the mixed fluid of components (A) to (D) described above, for example, polymerization catalysts such as those described in Japanese Patent Application Laid-Open Nos. Heisei 07(1995)-063902, Heisei 07(1995)-104101, Heisei 09(1997)-208621 and Heisei 09(1997)-255781, internal mold releases such as those described in Japanese Patent Application Laid-Open Nos. Heisei 01(1989)-163012 and Heisei 03(1991)-281312, antioxidants and other auxiliary agents can be added, where necessary. Where necessary, red pigments can be added. Examples of the red pigment include quinacridone-based pigments such as quinacridone magenta of the CI number 73915 (pigment red 122), quinacridone pigment of the CI number 73900 (pigment red 19) and quinacridone E of the CI number 73905 (pigment red 209).

The plastic lens obtained in accordance with the present invention can be tinted with a tinting agent. A hard coat film may be formed on the plastic lens using a coating fluid containing an organic silicon compound or fine particles of an inorganic substance such as tin oxide, silicon oxide, zirconium oxide and titanium oxide to improve resistance to scratches. A primer layer containing a polyurethane as the main component may be formed to improve impact resistance. An antireflection film may be formed using silicon oxide, titanium dioxide, zirconium oxide or tantalum oxide to provide the antireflection property. A water-repelling film may be formed on the antireflection film using an organosilicon compound having fluorine atom to improve the water-repelling property.

The plastic lens prepared as described above suppresses coloring even though the lens absorbs ultraviolet light having a wavelength of about 400 nm and can be advantageously used as the plastic lens for spectacles.

EXAMPLE

The present invention will be specifically described in the following with reference to examples. However, the present invention is not limited to the examples. The properties of the plastic lenses obtained in Examples and Comparative Examples were obtained in accordance with the following methods.

(1) YI value: The YI value was obtained in accordance with the method for obtaining the yellow degree of plastics and the method for testing the yellowing of plastics described in Japanese Industrial Standard K7103-1977.

(2) Transmittance of ultraviolet light: The transmittance at the wavelength of 385 nm was measured by using a spectrophotometer (U3410, manufactured by HITACHI SEISAKUSHO Co., Ltd.).

(3) Luminous transmittance: The luminous transmittance was calculated using U3410.

(4) Appearance: The appearance of a lens was evaluated by visual observation.

Example 1

(a) Preparation of a Bluing Master Fluid

A mixed fluid prepared by dispersing a complex compound of cobalt oxide and aluminum oxide ($CoO.Al_2O_3$; the particle diameter: 40 to 50 nm; manufactured by Cl KASEI Co., Ltd.) in an amount of 3% by weight in a mixed dispersant of n-butanol and methyl Cellosolve (n-butanol: methyl Cellosolve=2:1, as the ratio of the amounts by mole), was used. The prepared mixed fluid was mixed with diethylene glycol bisallylcarbonate monomer in a manner such that the amount of the mixed fluid was 20% by weight and the amount of diethylene glycol bisallylcarbonate monomer was 80% by weight, and a bluing master fluid was prepared.

(b) Preparation of a Plastic Lens

To 100 parts by weight of diethylene glycol bisallylcarbonate, 3 parts by weight of diisopropyl peroxydicarbonate as the organic peroxide-based polymerization initiator, 1 part by weight of 2-hydroxy-4-octyloxybenzophenone as the ultraviolet light absorbent and 0.6 parts by weight of the bluing master fluid prepared above in (a) was added. After the obtained mixture was sufficiently mixed under stirring, the mixture was cast into a mold for forming a lens composed of glass molds and a gasket made of a resin (0.00D; the diameter of the lens: 70 mm; the thickness of the lens: set at 2.2 mm). The polymerization was conducted by slowly elevating the temperature from 40° C. to 90° C. over 20 hours in an electric oven, followed by keeping the temperature at 90° C. for 1 hour. After the polymerization was completed, the gasket and the glass molds were disassembled, and a lens was obtained after the heat treatment at 120° C. for 2 hours. The obtained plastic lens had a YI value of 0.74 and a transmittance of ultraviolet light having a wavelength of 385 nm of 1.82% at the central portion (the thickness: 2.2 mm). Thus, the lens exhibited the excellent property for absorbing ultraviolet light. The appearance was colorless and transparent. No uneven color tone due to the bluing master fluid was found. The luminous transmittance was 90.59%. The results are shown in Table 1.

Example 2

A plastic lens was obtained in accordance with the same procedures as those conducted in Example 1 except that 0.04 parts by weight of 2,2',4,4'-tetrahydroxy-4-octyloxybenzophenone was used as the ultraviolet light absorbent in place of 1 part by weight of 2-hydroxy-4-octyloxy-benzophenone and 0.4 parts by weight of the bluing master fluid was used. The obtained plastic lens had a YI value of 0.81 and a transmittance of ultraviolet light having a wavelength of 385 nm of 1.99% at the central portion (the thickness: 2.2 mm). Thus, the lens exhibited the excellent property for absorbing ultraviolet light. No uneven color tone due to the bluing master fluid was found. The luminous transmittance was 91.14%. The results are shown in Table 1.

Example 3

A plastic lens was obtained in accordance with the same procedures as those conducted in Example 1 except that 0.04 parts by weight of 2,2',4'-trihydroxy-4-octyloxybenzophenone was used as the ultraviolet light absorbent in place of 1 part by weight of 2-hydroxy-4-octyloxy-benzophenone and 0.3 parts by weight of the bluing master fluid was used. The obtained plastic lens had a YI value of 0.80 and a transmittance of ultraviolet light having a wavelength of 385 nm of 1.91% at the central portion (the thickness: 2.2 mm). Thus, the lens exhibited the excellent property for absorbing ultraviolet light. No uneven color tone due to the bluing master fluid was found. The luminous transmittance was 91.10%. The results are shown in Table 1.

Comparative Example 1

A plastic lens was obtained in accordance with the same procedures as those conducted in Example 1 except that 0.8 parts by weight of 2,4-dihydroxybenzophenone was used as the ultraviolet light absorbent in place of 1 part by weight of 2-hydroxy-4-octyloxybenzophenone and 0.8 parts by weight of the bluing master fluid was used. Although the obtained plastic lens had a transmittance of ultraviolet light having a wavelength of 385 nm of 1.65% at the central portion (the thickness: 2.2 mm), the YI value was 1.90, and the lens was colored yellow. The luminous transmittance was 90.35%. The results are shown in Table 1.

Comparative Example 2

A plastic lens was obtained in accordance with the same procedures as those conducted in Example 1 except that 0.3 parts by weight of 2,4-dihydroxybenzophenone was used as the ultraviolet light absorbent in place of 1 part by weight of 2-hydroxy-4-octyloxybenzophenone and 0.8 parts by weight of the bluing master fluid was used. Although the obtained plastic lens had a YI value of 0.78 at the central portion (the thickness: 2.2 mm), the transmittance of ultraviolet light having a wavelength of 385 nm was 9.45%, and the lens exhibited a poor property of absorbing ultraviolet light. The luminous transmittance was 90.35%. The results are shown in Table 1.

Comparative Example 3

A plastic lens was obtained in accordance with the same procedures as those conducted in Example 1 except that 0.8 parts by weight of 2,4-dihydroxybenzophenone was used as the ultraviolet light absorbent in place of 1 part by weight of 2-hydroxy-4-octyloxybenzophenone and 2.4 parts by weight of the bluing master fluid was used. Although the obtained plastic lens had a YI value of 0.79 and a transmittance of ultraviolet light having a wavelength of 385 nm of 1.65% at the central portion (the thickness: 2.2 mm), cloudiness was found on the lens, and the luminous transmittance was 88.40%, which was smaller than those in Examples 1 to 3. The results are shown in Table 1.

Comparative Example 4

A plastic lens was obtained in accordance with the same procedures as those conducted in Example 1 except that 0.25 parts by weight of 2-(5-methyl-2-hydroxyphenyl)benzotriazole was used as the ultraviolet light absorbent in place of 1 part by weight of 2-hydroxy-4-octyloxy-benzophenone and 1.0 part by weight of the bluing master fluid was used. Although the obtained plastic lens had a transmittance of ultraviolet light having a wavelength of 385 nm of 1.22% at the central portion (the thickness: 2.2 mm), the YI value was 2.15, and the lens was colored yellow. The luminous transmittance was 90.13%. The results are shown in Table 1.

Comparative Example 5

A plastic lens was obtained in accordance with the same procedures as those conducted in Example 1 except that 0.15 parts by weight of 2-(5-methyl-2-hydroxyphenyl)benzotriazole was used as the ultraviolet light absorbent in place of 1 part by weight of 2-hydroxy-4-octyloxy-benzophenone and 1.0 part by weight of the bluing master fluid was used. Although the obtained plastic lens had a YI value of 0.75 at the central portion (the thickness: 2.2 mm), the transmittance of ultraviolet light having a wavelength of 385 nm was 9.30%, and the lens exhibited a poor property of absorbing ultraviolet light. The luminous transmittance was 90.24%. The results are shown in Table 1.

Comparative Example 6

A plastic lens was obtained in accordance with the same procedures as those conducted in Example 1 except that 0.25 parts by weight of 2-(5-methyl-2-hydroxyphenyl)benzotriazole was used as the ultraviolet light absorbent in place of 1 part by weight of 2-hydroxy-4-octyloxy-benzophenone and 2.75 parts by weight of the bluing master fluid was used. Although the obtained plastic lens had a YI value of 0.75 and a transmittance of ultraviolet light having a wavelength of 385 nm of 1.22% at the central portion (the thickness: 2.2 mm), cloudiness was found on the lens, and the luminous transmittance was 88.74%, which was smaller than those in Examples 1 to 3. The results are shown in Table 1.

Comparative Example 7

A plastic lens was obtained in accordance with the same procedures as those conducted in Example 1 except that 0.07 parts by weight of 5-chloro-2-(2,4-dihydroxyphenyl)benzotriazole was used as the ultraviolet light absorbent in place of 1 part by weight of 2-hydroxy-4-octyloxy-benzophenone and 1.0 part by weight of the bluing master fluid was used. Although the obtained plastic lens had a transmittance of ultraviolet light having a wavelength of 385 nm of 1.48% at the central portion (the thickness: 2.2 mm), the YI value was 2.02, and the lens was colored yellow. The luminous transmittance was 90.21%. The results are shown in Table 1.

Comparative Example 8

A plastic lens was obtained in accordance with the same procedures as those conducted in Example 1 except that 0.35 parts by weight of 5-chloro-2-(2,4-dihydroxyphenyl)benzotriazole was used as the ultraviolet light absorbent in place of 1 part by weight of 2-hydroxy-4-octyloxy-benzophenone and 1.0 part by weight of the bluing master fluid was used.

Although the obtained plastic lens had a YI value of 0.81 at the central portion (the thickness: 2.2 mm), the transmittance of ultraviolet light having a wavelength of 385 nm was 10.10%, and the lens exhibited a poor property of absorbing ultraviolet light. The luminous transmittance was 90.24%. The results are shown in Table 1.

Comparative Example 9

A plastic lens was obtained in accordance with the same procedures as those conducted in Example 1 except that 0.07 parts by weight of 5-chloro-2-(2,4-dihydroxyphenyl)benzotriazole was used as the ultraviolet light absorbent in place of 1 part by weight of 2-hydroxy-4-octyloxy-benzophenone and 2.75 parts by weight of the bluing master fluid was used. Although the obtained plastic lens had a YI value of 0.80 and a transmittance of ultraviolet light having a wavelength of 385 nm of 1.48% at the central portion (the thickness: 2.2 mm), cloudiness was found on the lens, and the luminous transmittance was 88.56%, which was smaller than those in Examples 1 to 3. The results are shown in Table 1.

TABLE 1

|  | Type of ultraviolet light absorbent | Amount of ultraviolet light absorbent (part by weight) | Amount of bluing master fluid (part by weight) | YI value | Transmittance of ultraviolet light having wavelength of 385 nm (%) | Luminous transmittance (%) | Appearance |
|---|---|---|---|---|---|---|---|
| Example |  |  |  |  |  |  |  |
| 1 | sb102 | 1.00 | 0.60 | 0.74 | 1.82 | 90.59 | colorless, transparent |
| 2 | sb106 | 0.04 | 0.40 | 0.81 | 1.99 | 91.14 | colorless, transparent |
| 3 | sb1060 | 0.05 | 0.30 | 0.80 | 1.91 | 91.10 | colorless, transparent |
| Comparative Example |  |  |  |  |  |  |  |
| 1 | sb100 | 0.80 | 0.80 | 1.90 | 1.65 | 90.35 | yellow, transparent |
| 2 | sb100 | 0.30 | 0.80 | 0.78 | 9.45 | 91.07 | colorless, transparent |
| 3 | sb100 | 0.80 | 2.40 | 0.79 | 1.65 | 88.40 | cloudy |
| 4 | sb701 | 0.25 | 1.00 | 2.15 | 1.22 | 90.13 | yellow, transparent |
| 5 | sb701 | 0.15 | 1.00 | 0.75 | 9.30 | 90.24 | colorless, transparent |
| 6 | sb701 | 0.25 | 2.75 | 0.75 | 1.22 | 88.74 | cloudy |
| 7 | sb7012 | 0.07 | 1.00 | 2.02 | 1.48 | 90.21 | yellow, transparent |
| 8 | sb7012 | 0.35 | 1.00 | 0.81 | 10.10 | 90.18 | colorless, transparent |
| 9 | sb7012 | 0.07 | 2.75 | 0.80 | 1.48 | 88.56 | cloudy | sb102: 2-Hydroxy-4-octyloxybenzophenone
sb106: 2,2',4,4'-Tetrahydroxy-4-octyloxybenzophenone
sb1060: 2,2',4'-Trihydroxy-4-octyloxybenzophenone
sb100: 2,4-Dihydroxybenzophenone
sb701: 2-(5-Methyl-2-hydroxyphenyl)benzotriazole
sb7012: 5-Chloro-2-(2,4-dihydroxyphenyl)benzotriazole.

In accordance with the process of the present invention, a plastic lens which absorbs ultraviolet light having wavelength of about 400 nm and suppresses coloring can be obtained. The obtained lens is advantageously used as a plastic lens for spectacles.

While the invention has been described in connection with certain embodiments so that aspects thereof may be more fully understood and appreciated, it is not intended to limit the invention to these particular embodiments. On the contrary, it is intended to cover all alternatives, modifications and equivalents as may be included within the scope of the invention or defined by the appended claims.

What is claimed is:

1. A process for producing a plastic lens which comprises: mixing the following components (A) to (D) to form a mixed fluid:

(A) a lens material monomer comprising diethylene glycol bisallylcarbonate, (B) an organic peroxide-based polymerization initiator, (C) a cobalt fluid comprising a cobalt compound represented by at least one of $CoO \cdot Al_2O_3$ and $Co \cdot Al_2O_4$ in a dispersant, and (D) at least one ultraviolet light absorbent selected from 2-hydroxy-4-octyloxybenzophenone, 2,2',4,4'-tetrahydroxy-4-octyloxybenzophenone and 2,2',4'-trihydroxy-4-octyloxybenzophenone; and degassing the mixed fluid to remove the entire amount or a portion of the dispersant, casting the fluid obtained by the degassing into a mold and polymerizing the fluid to obtain a plastic lens.

2. A process for producing a plastic lens according to claim 1, wherein the organic peroxide-based polymerization initiator of component (B) is at least one compound selected from benzoyl peroxide, diisopropyl peroxydicarbonate and t-butyl peroxy-2-ethyl-hexanoate.

3. A process for producing a plastic lens according to claims 1 or 2, wherein the cobalt compound of component (C) is in particulate form and has a particle diameter of from 10 to 1,000 nm.

4. A process for producing a plastic lens according to claims 1 or 2, wherein the dispersant comprises at least one dispersant selected from alcohols, mono- or dialkyl ethers of ethylene glycol and surfactants.

5. A process for producing a plastic lens according to claim 4, wherein the dispersant is a mixed fluid comprising a methyl ether of ethylene glycol, butanol and a surfactant.

6. A process for producing a plastic lens according to claims 1 or 2, wherein the plastic lens is a plastic lens for spectacles.

* * * * *